(12) United States Patent
Simm et al.

(10) Patent No.: US 8,083,006 B2
(45) Date of Patent: Dec. 27, 2011

(54) HAND-HELD POWER TOOL

(75) Inventors: Robert Simm, Oekingen (CH); Aldo Di Nicolantonio, Recherswil (CH)

(73) Assignee: Robert Bosch GmbH, Stuttgart (DE)

( * ) Notice: Subject to any disclaimer, the term of this patent is extended or adjusted under 35 U.S.C. 154(b) by 248 days.

(21) Appl. No.: 12/293,755

(22) PCT Filed: Oct. 17, 2007

(86) PCT No.: PCT/EP2007/061047
§ 371 (c)(1),
(2), (4) Date: Sep. 19, 2008

(87) PCT Pub. No.: WO2008/068103
PCT Pub. Date: Jun. 12, 2008

(65) Prior Publication Data
US 2010/0163264 A1 Jul. 1, 2010

(30) Foreign Application Priority Data
Dec. 5, 2006 (DE) .................... 10 2006 057 283

(51) Int. Cl.
*B25B 23/14* (2006.01)

(52) U.S. Cl. ....... 173/178; 173/48; 173/201; 192/56.56; 192/150

(58) Field of Classification Search .......... 173/178, 173/217, 201, 48, 216, 104; 81/474, 467; 192/56.1, 83, 56.56, 34, 150
See application file for complete search history.

(56) References Cited

U.S. PATENT DOCUMENTS

| | | | | |
|---|---|---|---|---|
| 3,275,116 A * | 9/1966 | Martin | ................ | 192/150 |
| 3,515,251 A * | 6/1970 | Clapp | ................ | 192/150 |
| 3,934,629 A * | 1/1976 | Boman | ................ | 81/429 |
| 4,049,104 A * | 9/1977 | Webb | ................ | 192/150 |
| 4,088,197 A * | 5/1978 | Roll et al. | ................ | 173/178 |
| 4,403,663 A * | 9/1983 | Janssen | ................ | 173/178 |
| 4,488,604 A * | 12/1984 | Whitehouse | ................ | 173/178 |
| 4,641,551 A | 2/1987 | Pascaloff | | |
| 4,880,064 A * | 11/1989 | Willoughby et al. | ......... | 173/178 |
| 4,883,130 A * | 11/1989 | Dixon | ................ | 173/178 |
| 4,986,369 A * | 1/1991 | Fushiya et al. | ................ | 173/178 |
| 5,060,733 A * | 10/1991 | Kress | ................ | 173/178 |
| 5,209,308 A * | 5/1993 | Sasaki | ................ | 173/178 |
| 5,458,206 A * | 10/1995 | Bourner et al. | ................ | 173/178 |
| 5,538,089 A * | 7/1996 | Sanford | ................ | 173/2 |
| 5,868,208 A * | 2/1999 | Peisert et al. | ................ | 173/178 |
| 7,334,647 B2 * | 2/2008 | Hahn | ................ | 173/178 |
| 2005/0284648 A1 | 12/2005 | Frauhammer et al. | | |

FOREIGN PATENT DOCUMENTS

| | | |
|---|---|---|
| DE | 30 43 575 | 6/1982 |
| DE | 38 32 202 | 3/1990 |
| DE | 101 30 520 | 1/2003 |
| EP | 0 277 105 | 8/1988 |
| EP | 1 731 266 | 12/2006 |
| GB | 1 492 543 | 11/1977 |
| GB | 2 378 488 | 2/2003 |

* cited by examiner

*Primary Examiner* — Scott A. Smith
(74) *Attorney, Agent, or Firm* — Michael J. Striker

(57) ABSTRACT

A hand-held power tool, in particular an electrical hand-held power tool (1), includes a drive motor (4), a tool shaft (14), and a first overload clutch (19) for limiting the maximum torque that acts on the tool shaft (14). Preferably, the hand-held power tool also includes a second overload clutch (20).

8 Claims, 4 Drawing Sheets

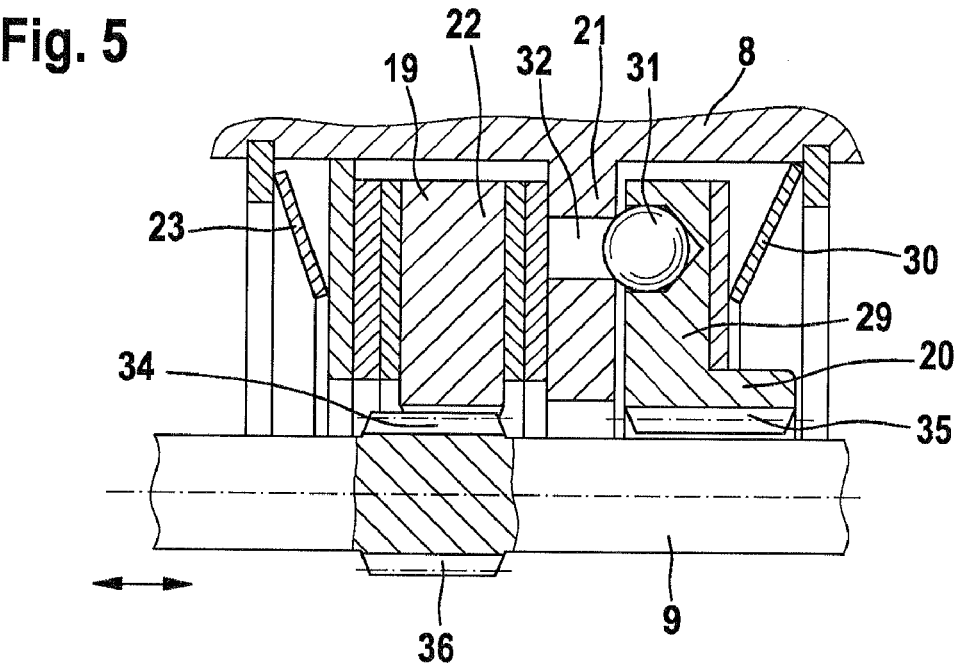
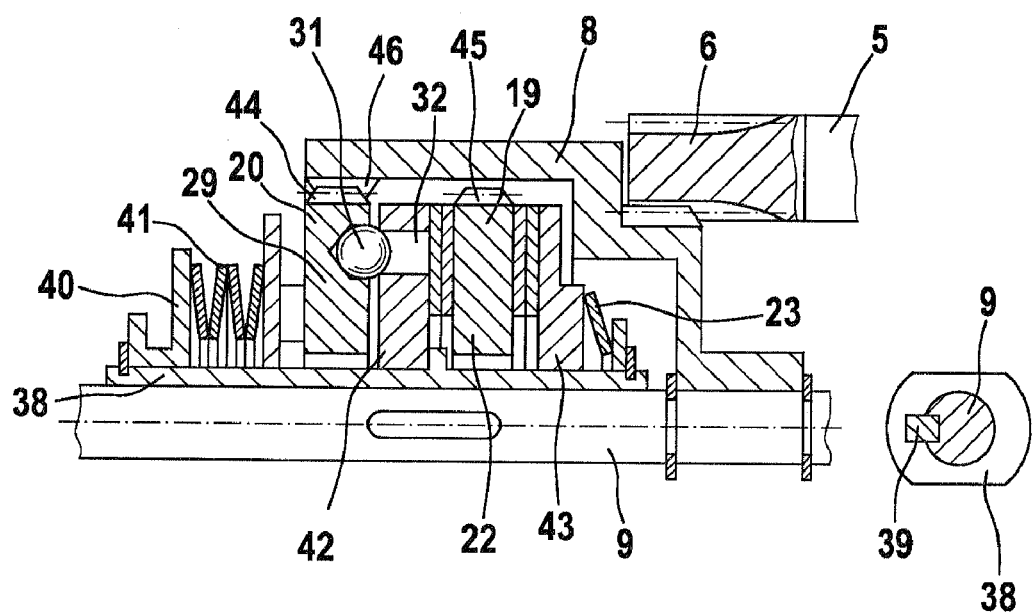

HAND-HELD POWER TOOL

BACKGROUND OF THE INVENTION

The present invention relates to a hand-held power tool, in particular an electric hand-held power tool, in particular a drill or a cordless screwdriver.

Hand-held power tools with a drive motor designed as an electric motor, in particular, have been known for a long time. With screwdriver tools in particular, it is also known to locate an overload clutch between the drive motor and the tool shaft, as a torque-limiting device in the power-transmission chain, in order to limit the maximum amount of torque that may be transferred to the tool shaft. When a maximum torque is exceeded, the frictional connection between the motor and the tool—which is driven in a rotating manner by the tool shaft—is interrupted as quickly as possible, in order to protect the operator and the workpiece and/or product being machined.

In addition, hand-held power tools are known that include an adjustable overload clutch that serves to adjust the maximum amount of torque that may be transferred depending on the task at hand. To vary the torque, the spring force of a closing spring that acts on a coupling part of the overload clutch—in particular a rigid, locking clutch—is varied.

It was observed that the adjustment device on known hand-held power tools with an adjustable overload clutch does not always function perfectly.

SUMMARY OF THE INVENTION

The object of the present invention is to provide an alternative design of a hand-held power tool with which a selection may be reliably made between at least two different maximum transmissible torques.

The present invention is based on the idea of providing a second overload clutch in addition to the first overload clutch, it being possible to operate the two clutches in an either/or manner, and/or jointly, in a torque-transferring manner, in the drive train of the hand-held power tool. The two overload clutches are non-adjustable couplings, thereby making it possible, advantageously, to eliminate an adjustment device for varying the maximum torque of every individual, separate coupling. By providing two separate overload clutches, it is easily possible to vary the maximum amount of torque that may be transmitted, by switching between the overload clutches or by activating the second overload clutch.

In one embodiment of the present invention, the two overload clutches are different sizes, thereby making it possible, in an alternative operating mode, to transfer torques of two different magnitudes.

In order to further increase the operating comfort of the hand-held power tool, it is provided in one embodiment of the present invention involving a hand-held power tool with a switchable gearbox, that, in order to switch between at least two operating speeds, a common switch is provided to switch the gearbox and to engage or disengage the first and/or second overload clutch. The common switch is preferably provided with at least two transmission rods, one of which serves to switch the gearbox, and the second of which serves to engage or disengage the overload clutches.

To realize two different maximum transmissible torques, it is advantageously provided in a refinement of the present invention that the at least two overload clutches are different types of couplings. Preferably, one of the overload clutches is designed as a friction clutch and the other overload clutch is designed as a rigid, locking clutch (a safety clutch system). It is also feasible to provide two overload clutches that have the same design but are different sizes.

It has proven advantageous to assign both overload clutches to a countershaft, which is located parallel—in particular—to the tool shaft. The overload clutches may be located and/or connected in an either-or manner or jointly in order to transfer torque from the drive motor to the countershaft. In turn, the torque is transferred from the countershaft—in particular when a gearbox is connected in-between—to the tool shaft that drives the tool, or the torque is transferred initially to one or more intermediate shafts.

According to an advantageous embodiment of the present invention, it is provided that the weaker clutch (less maximum torque) is located such that it may transfer torque permanently, i.e., it may not be engaged and disengaged. The weaker clutch is preferably designed as a friction clutch. If necessary, a stronger clutch (greater maximum torque) may be connected with the weaker clutch. The stronger overload clutch is preferably designed as a rigid, locking clutch. According to one embodiment of the present invention, to connect the stronger overload clutch, a switching bar is provided that is located axially inside the countershaft. By axially displacing the switching bar, it is possible—in particular by using radially displaceable balls—to establish a form-fit connection between the countershaft and the stronger clutch.

As an alternative, it is feasible to provide a displaceable switching bar on the countershaft, which is coupled—in particular via toothed engagement—with the countershaft in a torque-transferring manner. The switching bar is preferably designed as a shifting sleeve that encloses the entire circumference of the countershaft in sections. The switching bar is displaceable between at least two shift positions, in which either the first or the second overload clutch is connected with the countershaft in a torque-transferring manner. It is also feasible that, in one shift position, both overload clutches are coupled jointly with the countershaft in a torque-transferring manner.

It is also feasible to design the entire countershaft as a switching bar and to locate it such that it may be axially displaced between at least two shift positions.

According to an alternative embodiment, it is provided that the countershaft is supported in a hand-held power tool housing in an axially displaceable manner, and for the entire clutch system—which is composed of the at least two overload clutches—to be displaceable axially relative to the countershaft, in which case the clutch components are preferably coupled via their outer circumference.

It is also feasible, as an alternative method for actuating the at least two overload clutches, to provide a switching bar designed as a shift wedge, which includes two diametrically opposed conical sections, each of which interacts with balls that are displaceable in the radial direction.

It is also feasible to locate the stronger overload clutch such that it may transfer torque permanently, and for a weaker overload clutch to be connectable thereto, it being possible—in the connected state—for only the lesser maximum torque of the weaker overload clutch to be transferred. The weaker overload clutch may be engaged and disengaged, e.g., using a switching bar that is axially displaceable on the countershaft.

BRIEF DESCRIPTION OF THE DRAWINGS

Further advantages, features, and details of the present invention result from the description of preferred exemplary embodiments, below, and with reference to the drawing, which shows:

FIG. 5: an alternative design of two overload clutches, the countershaft being axially displaceable in order to switch between the overload clutches, FIG. 6: an alternative design of two overload clutches, which may be displaced together axially relative to the axially fixed countershaft.

DETAILED DESCRIPTION OF THE PREFERRED EMBODIMENTS

Figure 1:
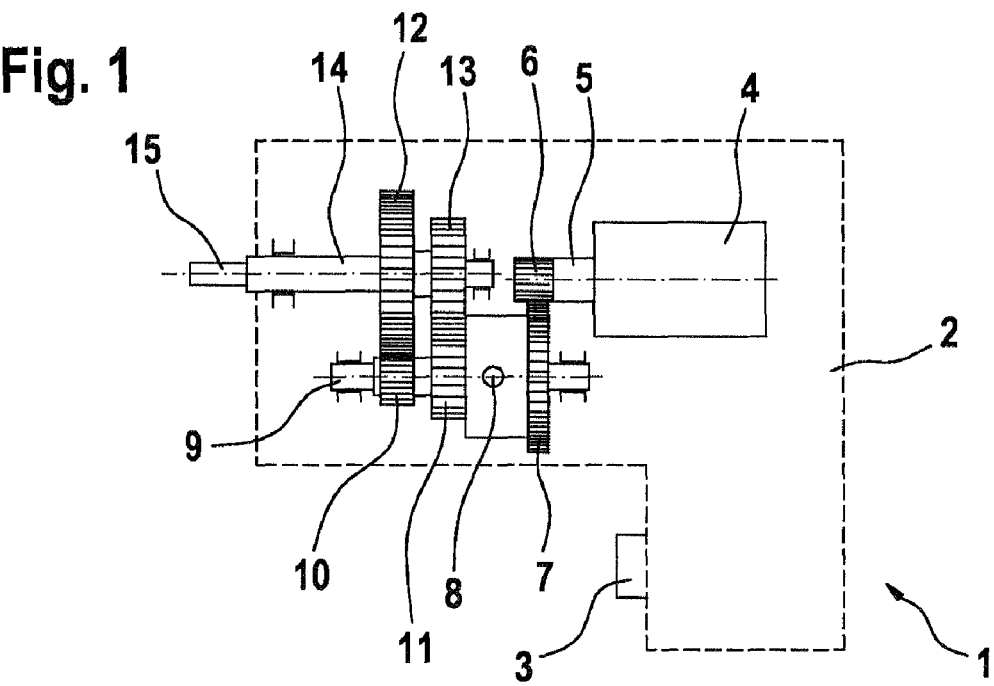
FIG. 1: a schematic depiction of an electric hand-held power tool.

Identical components and components with the same functionality are labelled with the same reference numerals in the figures.

FIG. 1 shows an electric hand-held power tool 1 with a housing 2. A power switch 3 is located on the housing 2, with which a drive motor 4—which is designed as an electric motor—may be switched on and off.

Torque is transferred from a motor shaft 5—on which an output pinion 6 is non-rotatably mounted—to a drive pinion 7, which is non-rotatably connected with a sleeve-shaped clutch housing 8. Clutch housing 8 belongs to two overload clutches, which will be described below.

Clutch housing 8 is located coaxially with countershaft 9, which is rotatably supported inside housing 2. Two output pinions 10, 11 with different diameters are mounted on countershaft 9, axially adjacent to each other. Output pinions 10, 11 each mesh with a drive pinion 12, 13. Drive pinions 12, 13 are capable of being coupled—either one or the other, in a manner known per se—in a torque-transferring manner with tool shaft 14, which passes through them. Torque may therefore be transferred from drive motor 4 via motor shaft 5, output pinion 6, drive pinion 7, and clutch housing 8 with the two overload clutches, to countershaft 9, from which the torque may be transferred via output pinion 10, 11 and via drive pinion 12 or drive pinion 13 to tool shaft 14. In turn, tool shaft 14 drives a tool 15 in a rotating manner. Tool 15 is a screwdriver bit in this case.

Figure 2A:
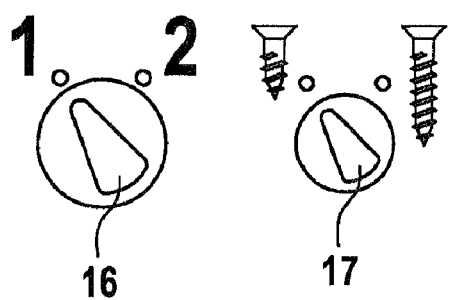
FIG. 2a: two separate switches for switching a gearbox and adjusting two different maximum torques.

FIG. 2a shows a first switch 16 and a second switch 17, both of which are rotary knobs. Switches 16, 17 are typically located on housing 2, which is shown in FIG. 1. Using switch 16, it is possible to connect the two drive pinions 12, 13 with tool shaft 14 either one or the other, and in a torque-transferring, form-fit manner. Switch 17 is used to switch between two maximum transferrable torques, i.e., to engage either of the two overload clutches.

Figure 2B:
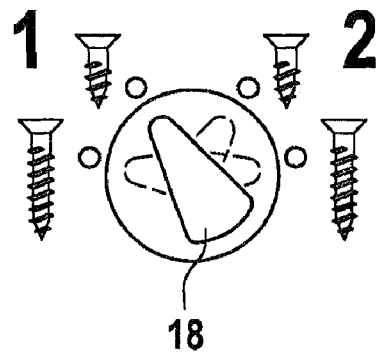
FIG. 2b: one switch for switching the gearbox and adjusting two different maximum torques.

FIG. 2b shows a preferred exemplary embodiment. One rotary knob 18 is provided to switch the gearbox (drive pinion 12/drive pinion 13) and to switch between two maximum transmissible torques. Common rotary knob 18 makes it possible to switch between two maximum transmissible torques in both gearbox stages. To this end, common switch 18 is coupled with two (not shown) transmission rods, one of which acts on the gearbox in a switching manner, and the other of which acts on the overload clutches—to be described below—in a switching manner.

Figure 3:
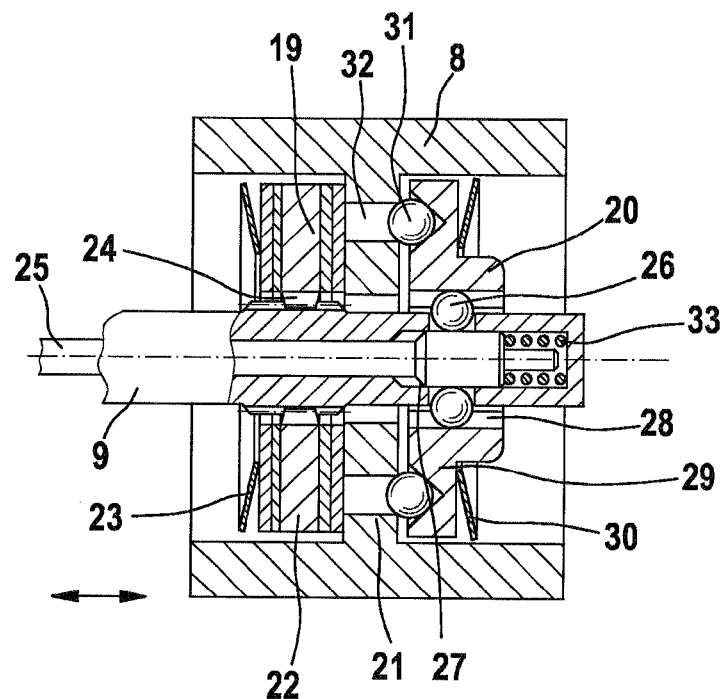
FIG. 3: a possible design of two separate overload clutches; a switching bar that is displaceable within a countershaft is provided to connect and disconnect the stronger overload clutch.

FIG. 3 shows a system of two separate overload clutches 19, 20, in which case overload clutch 19 is designed as a friction clutch, and overload clutch 20 is designed as a rigid, locking clutch. In this exemplary embodiment, second overload clutch 20 serves to transfer a greater maximum torque. As explained with reference to FIG. 1, clutch housing 8 is driven in a rotating manner by a drive motor 4. Sleeve-shaped clutch housing 8 includes a radially inwardly projecting ring 21, against which a clutch component 22—through which countershaft 9 passes—is pressed in the axial direction, on the end-face side. A disk-spring element 23 is provided to apply force axially to clutch component 22. Clutch component 22 is connected in a form-fit manner with countershaft 9 via an inner toothing 24, so that first overload clutch 19 is located such that it transfers torque permanently. When a maximum torque is exceeded, the static friction between clutch component 22 and ring 21 no longer suffices to transfer the torque to the countershaft. Clutch housing 8 with ring 21 therefore moves in the circumferential direction relative to clutch component 22, and ring 21 therefore slides past clutch component 22. When it becomes necessary to transfer a greater maximum torque, second overload clutch 20 is connected. To this end, a switching bar 25 is provided, which is located inside countershaft 9 such that it may be displaced in the axial direction. By displacing switching bar 25 to the left (in the plane of the drawing, and in the position shown), securing balls 26 located around the circumference of switching bar 25 are pressed outwardly via a conical projection 27 into pockets 28—that are offset in the circumferential direction—of a second clutch component 29 of second overload clutch 20, thereby coupling it with countershaft 9 in a form-fit manner. In turn, second clutch component 29 is pressed axially by a disk-spring element 30 against ring 21 of clutch housing 9, thereby resulting in clutch balls 31—which are distributed around the circumference—being pressed axially into receiving pockets 32 in ring 21, which results in torque being transmitted from clutch housing 8 and/or ring 21 to second clutch component 29 and, from there, via securing balls 26 to countershaft 9. When a second maximum torque is exceeded, second clutch component 29 is moved axially by securing balls 31 against the force of the disk spring of disk-spring element 30, thereby disengaging second overload clutch 20 (temporarily) (safety clutch system). If the intention is to disengage second overload clutch 20, switching bar 25 is moved toward the right—in the plane of the drawing—against the force of a coil spring 33, thereby enabling securing balls 26 to travel radially inwardly, which, in turn, releases the form-fit connection between second clutch component 29 and countershaft 9.

Figure 4:
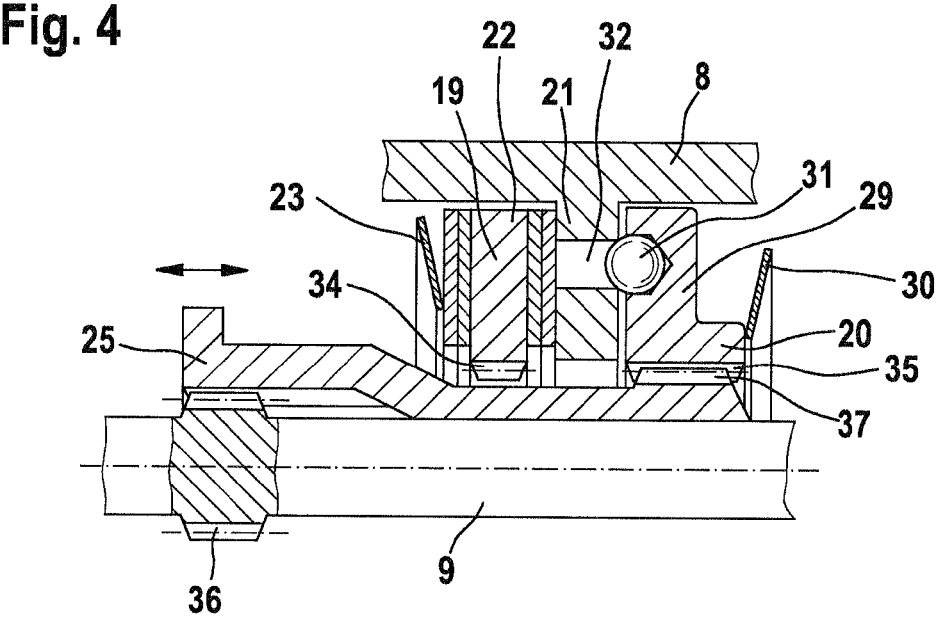
FIG. 4: an alternative design of two overload clutches; a switching bar is provided to actuate either of the two overload clutches, and it is located such that it is axially displaceable on the outer circumference of a countershaft.

FIG. 4 shows an alternative design of two overload clutches 19, 20. In this exemplary embodiment, the two overload clutches 19, 20 may only be operated in an either/or manner. To this end, the two clutch components 22, 29 are provided with toothing 34, 35 on their inner circumference. A switching bar 25 is coupled with countershaft 9 in a torque-transferring manner via a pinion 36 that is non-rotatably mounted on countershaft 9. Switching bar 25, which is designed as a sleeve, is connectable via an outer toothing 37 with toothing 34 of first overload clutch 19 or with toothing 35 of second overload clutch 20 (shown) in a torque-transmitting manner.

With the exemplary embodiment shown in FIG. 5, countershaft 9 is displaceable in the axial direction relative to both overload clutches 19, 20, and pinion 36—which is non-rotatably mounted on countershaft 9—may be engaged with inner toothing 34 of first overload clutch 19 (shown in FIG. 5) or with inner toothing 35 of second clutch component 29 of second overload clutch 20.

A further exemplary embodiment is shown in FIG. 6. Countershaft 9 is located such that it is non-displaceable. A carriage 38 that encloses countershaft 9 is located such that it is axially displaceable relative to countershaft 9. In the circumferential direction, however, carriage 38 is coupled with the countershaft in a torque-transmitting manner via a segment 39 (shown in the right half of the drawing). A component 40 is provided on carriage 38 that serves to engage behind a not-shown transmission rod. Second overload clutch 20, which is located on the left-hand side in this exemplary embodiment, includes an annular clutch component 29, which is acted upon axially with spring force by a spring element 41 in the direction of an annular component 42, which is non-rotatably connected with carriage 38. As a result, clutch balls 31 engage axially in receiving pockets 32 in annular component 42, thereby enabling a torque to be transmitted in the circumferential direction. When a maximum torque is exceeded, clutch component 29 is moved in the axial direction by clutch balls 31 against the force of spring element 41, thereby disengaging second overload clutch 20. First overload clutch 19 includes a clutch component 22 that is pressed by a disk-spring element 23 via a further clutch component 43 in the axial direction against annular component 42, which is coupled with carriage 38 in a non-rotatable manner, and is therefore also coupled with countershaft 9 in a torque-transmitting manner. Each of the clutch components 22, 29 is provided with an outer toothing 44, 45, either of which may be engaged with an inner toothing 46 of sleeve-shaped clutch housing 8 by axially displacing carriage 38, thereby making it possible to use first overload clutch 19 or second overload clutch 20 in a torque-transmitting manner.

Figure 7:
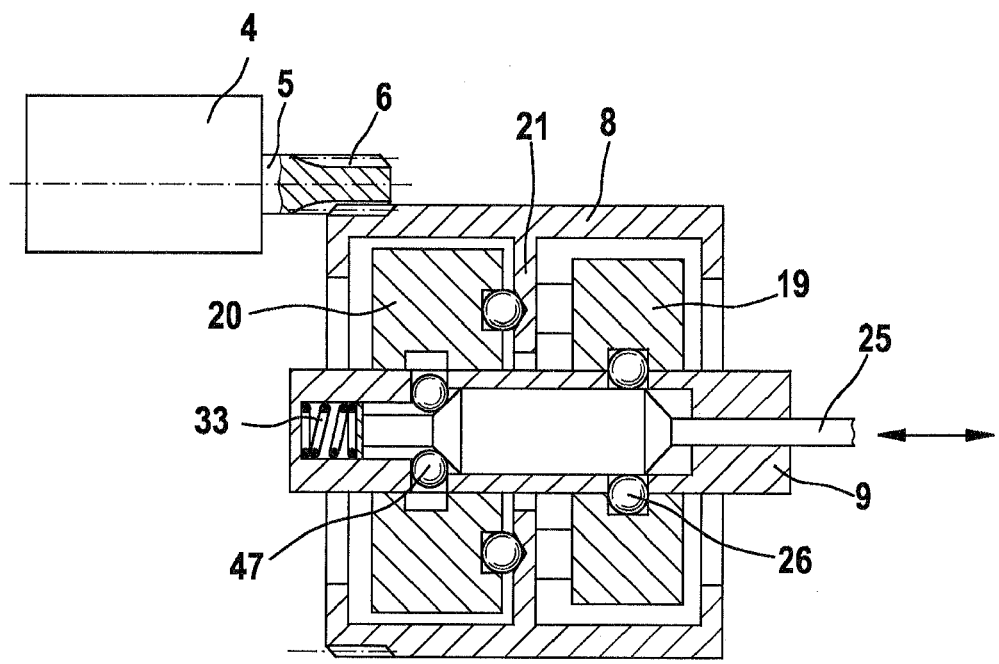
FIG. 7: an alternative design of two overload clutches that may be operated in an either/or manner, a wedge gear being provided to engage the overload clutches.

With the exemplary embodiment shown in FIG. 7, either of the two overload clutches 19, 20 may be operated in a torque-transmitting manner via a switching bar 25 designed as a double wedge. Switching bar 25 interacts with two separate securing ball systems 26, 47, via which a form-fit connection may be established between countershaft 9 and the two overload clutches 19, 20. Switching bar 25 is thereby displaceable against the spring force of a coil spring 33. It is also feasible for switching bar 25 to be couplable directly in both functional directions without using a coil spring.

Figure 8:
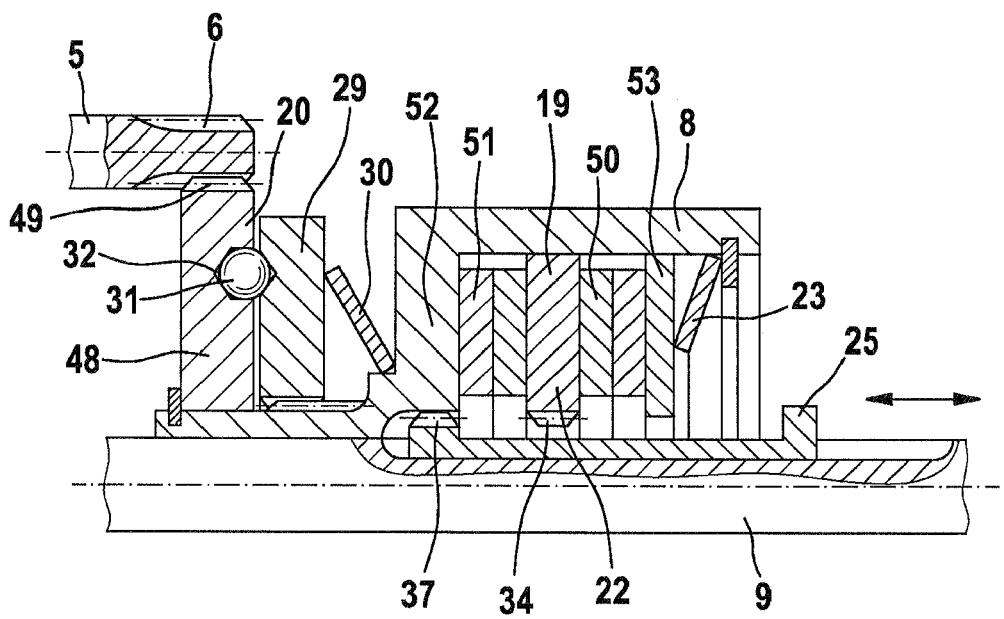
FIG. 8: an alternative design of two overload clutches, it being possible to connect and disconnect the weaker overload clutch.

FIG. 8 shows an alternative exemplary embodiment, with which the second, stronger overload clutch 20 designed as a safety clutch system is located such that it transmits torque permanently. To this end, an annular component 48 is connected via a pinion 49 with output pinion 6 of motor shaft 5 such that it transmits torque permanently. Component 48 is mounted on the outside of clutch housing 8 in a non-rotatable manner. A set of clutch balls 31 that is offset in the circumferential direction is located axially between component 48 and second clutch component 29 of second overload clutch 20. Component 29 is acted upon with spring force in the axial direction by a disk-spring element 30, so that clutch balls 31 engage axially in receiving pockets 32 in component 48, thereby producing a form-fit connection that is capable of transmitting torque in the circumferential direction. When the torque to be transmitted exceeds a maximum permissible torque, component 29 is moved in the axial direction against the spring force of disk-spring element 30, thereby disengaging second overload clutch 20. First overload clutch 19 may be connected with second overload clutch 20. A switching bar 25 that includes an outer toothing 37 and is axially displacable on countershaft 9 is used for this purpose. Outer toothing 37 may be engaged with an inner toothing 34 of first clutch component 22 of first overload clutch 19. Switching bar 25 is coupled with countershaft 9 such that torque is transmitted in the circumferential direction. An annular, axially displaceable clutch component 53 is acted upon with spring force by a disk-spring element 23 in the direction toward first clutch component 22. As a result, first clutch component 22 is accommodated in a clamping manner between two friction yokes 50, 51 on both sides of clutch component 22. Friction yoke 51 bears against a radial wall 52 of clutch housing 8. When a maximum torque is exceeded, friction yokes 50, 51 slide past first clutch component 22.

What is claimed is:

1. A hand-held power tool, comprising:
   a drive motor (4);
   a tool shaft (14);
   a first overload clutch (19) for limiting the maximum torque that acts on the tool shaft (14); and
   at least one second overload clutch (20), wherein each of said first overload clutch and said at least one second overload clutch is assigned to a countershaft (9) disposed parallel to the tool shaft (14), wherein the first and second overload clutches (19, 20) are designed to transfer different maximum torques.

2. The hand-held power tool as recited in claim 1, wherein the first overload clutch and the at least one second overload clutch (19, 20) are arranged to selectively transfer torque individually or jointly.

3. The hand-held power tool as recited in claim 1, wherein a common switch (17) is provided to switch a gearbox (12, 13) and for engaging and disengaging the first overload clutch, the at least one second overload clutch, or both the first overload clutch and the at least one second overload clutch (19, 20).

4. The hand-held power tool as recited claim 1, wherein the first overload clutch (19) is designed as a friction clutch, and the second overload clutch (20) is designed as a rigid, locking clutch.

5. The hand-held power tool as recited in claim 1, wherein the first overload clutch (19) is located such that the first overload clutch (19) cannot be engaged or disengaged, and further comprising an axially displaceable switching bar (25) that is axially displaceable within the countershaft (9), wherein said axially displaceable switching bar (25) is configured to engage or disengage the second overload clutch (20), and wherein said countershaft (9) is a hollow shaft.

6. The hand-held power tool as recited in claim 1, further comprising a switching bar (25) configured to engage and disengage the first overload clutch and the at least one second overload clutch, wherein said switching bar (25) is coupled with the countershaft (9) in a torque-transferring manner, wherein said switching bar (25) is displaceable in the axial direction along the countershaft (9).

7. The hand-held power tool as recited in claim 1, wherein the countershaft (9) is designed as a switching bar (25) that is displaceable in the axial direction relative to the overload clutches (19, 20).

8. The hand-held power tool as recited in claim 1, wherein the first overload clutch and the at least one second overload clutch (19, 20) are located such that they are displaceable together relative to the countershaft (9), and wherein both said first overload clutch and said at least one second overload clutch (19, 20) is configured to be engaged or disengaged on respective outer circumferences.

* * * * *